United States Patent [19]

Becker et al.

[11] 4,202,555
[45] May 13, 1980

[54] SEALING RING

[75] Inventors: Bernd Becker, Leimen; Hans Forch, Birkenau; Adam Helfrich, Wald-Michelbach; Gottfried Jung, Fürth, all of Fed. Rep. of Germany

[73] Assignee: Firma Carl Freudenberg, Weinheim, Fed. Rep. of Germany

[21] Appl. No.: 11,467

[22] Filed: Feb. 12, 1979

[30] Foreign Application Priority Data

Feb. 18, 1978 [DE] Fed. Rep. of Germany ....... 2807022

[51] Int. Cl.² ............................................. F16J 15/32
[52] U.S. Cl. .................................... 277/153; 277/165; 277/166; 277/186
[58] Field of Search ....................... 277/1, 9, 138, 152, 277/153, 154, 165, 166, 181, 186, 189, 189.5, 198, 199

[56] References Cited

U.S. PATENT DOCUMENTS 3,381,970  5/1968  Brown ............................. 277/165 X
3,980,309  9/1976  Dechavanne .................... 277/165 X
4,053,166 10/1977  Domkowski ....................... 277/152
4,141,563  2/1979  Wu ..................................... 277/152

FOREIGN PATENT DOCUMENTS 1194211  6/1965  Fed. Rep. of Germany ........... 277/152
544881   4/1942  United Kingdom ..................... 277/181
1371341 10/1974  United Kingdom ..................... 277/153

Primary Examiner—Robert S. Ward, Jr.
Attorney, Agent, or Firm—Sprung, Felfe, Horn, Lynch & Kramer

[57] ABSTRACT

A sealing ring comprises a reinforcing ring composed of thermoplastic material and has at least one annular groove therein and a lip ring concentrically nested in the reinforcing ring and having a circular bead for each annular groove. The circular bead has the same profile as the annular groove and is set therein. Each bead has a profile which in the projecting portion is enlarged in the manner of a wedge extending essentially radially outwardly and a nominal diameter on which each bead is disposed is smaller than the nominal diameter of the associated groove.

11 Claims, 4 Drawing Figures

SEALING RING

BACKGROUND OF THE INVENTION

The invention relates to a sealing ring comprising a reinforcing ring made of a thermoplastic material and a lip ring with a circular bead which is set into a circular groove of the same profile in the reinforcing ring.

A sealing ring of this type is known from published examined German patent application (DE-AS) 2,312,548. It comprises a lip ring made of an elastomeric material and having a flangelike projection. Disposed on either side of this flangelike projection are the two parts of the reinforcing ring, which are bonded, welded or riveted to each other. In addition to the three operations required to produce the components of the sealing ring, a fourth operation is therefore required to join the parts together.

SUMMARY OF THE INVENTION

The invention has as its object to modify a sealing ring of this type is such a way that it consists of fewer than three parts and can be produced in fewer than four operations.

In accordance with the invention, this object is accomplished by the structure of the present invention wherein the reinforcing ring and the lip ring are concentrically nested and that one or more beads extend essentially radially outwardly, their profile being enlarged in the projecting portion in the manner of a wedge, the nominal diameter on which the bead or beads are disposed being smaller than the nominal diameter of the associated grooves. It has been found advantageous that the nominal diameter on which the bead or beads are disposed be at least about 0.5% smaller than the diameter of the grooves. Particularly advantageous is a difference in diameter of about 2%.

The bead or beads which extend essentially radially outwardly and whose projecting portions are enlarged in the manner of a wedge are in every case an integral part of the lip ring, made of an elastomeric material. Both the bead and the retaining part therefore have pronounced elastic properties which in accordance with the invention are utilized to provide a static seal between the lip ring and the reinforcing ring. It is surprising in this connection that even very low initial tensions will provide good sealing. This good sealing action is due particularly to the wedgelike compression which the profile of the beads undergoes in the direction of the particular point of application of the force. Due to the axial symmetry which underlies the construction of the sealing ring, perfectly balanced conditions prevail in this respect over the entire periphery.

In accordance with a particular design, two grooves in the reinforcing ring are associated with two beads on the lip ring, the beads and grooves being disposed in proximity to the opposed axial ends of the contact surfaces on both sides. With this construction, an additional axial component is impressed on the radial initial tension/compression of the beads, which results in an additional anchoring and static sealing effect. This construction further permits largely neutral mounting of the retaining part of the sealing lip, which is of particular advantage especially with respect to its angle of contact with the surface to be sealed, with respect to its relative mobility, and with respect to its neutral contact pressure.

In accordance with a particularly advantageous method for the manufacture of such a sealing ring, the reinforcing ring is produced first with a groove whose profile is uniformly or nonuniformly enlarged in the direction of the opening and bounded by lands; the bead of the prefabricated lip ring is set into the groove with radial expansion of the clamping portion in proximity thereto; and the land or lands are deformed in such a way that they uniformly enclose the bead. It is particularly advantageous if the lands are deformed by the application of pressure and/or heat. In accordance with another advantageous design, the lands are deformed by the use of high-frequency oscillations.

Thus the method in accordance with the invention is based on the fact that reinforcing ring and the lip ring are produced first independently of each other. Then the bead or beads on the lip ring are set into the corresponding grooves in the reinforcing ring with simultaneous elastic deformation, and the profile of the grooves is adapted to that of the beads through permanent deformation. Upon the shrinkage which follows, the lip ring thus is operatively connected and interlocked with the reinforcing ring.

For deformation of the lands, methods other than those named can be used. In view of particularly advantageous possibilities for automating the manufacturing process, methods making use of heated pressure rolls in particular have proved themselves extremely well.

From published unexamined German patent application (DE-OS) 2,157,015, a method of manufacturing a sealing ring is known in which the lip ring, made of an elastomeric material, is extruded in the hot plastic state directly onto a reinforcing ring made of a thermoplastic material. However, the results obtained with this method were highly unsatisfactory; specifically, since no adequate adhesion was secured between the two parts. The method therefore could not be employed in volume production.

In accordance with the invention, this prior art method is now modified in such a way that the reinforcing ring is produced in a first injection mold and with a groove whose profile is uniformly or nonuniformly enlarged in the direction of the opening bounded by the lands; that the lands are deformed in such a way that the groove is given a profile which internally is enlarged in the manner of a wedge; and that in a second injection mold an elastomeric material is extruded and vulcanized by the use of heat so that the bead and the lip ring are formed by filling the groove and the remaining cavity of the injection mold. It has proved particularly advantageous in this method for the lands to be deformed by the closing motion of the second mold when the elastomeric material is injected immediately thereafter and vulcanized with simultaneous heating of the lands. To assure that the desired wedgelike profile of the groove is obtained over the entire periphery, axial projections uniformly distributed over the periphery may be provided in proximity to the construction. However, the height of the projections must not exceed about 75% of the width of the groove.

In the manufacture of the sealing ring in accordance with the invention by this method, the reinforcing ring, made of a thermoplastic material, is thus produced first in a separate step. This is done by the use of a mold designed so that it contains the grooves, in which the finished reinforcing ring open radially inwardly, in the form of lands extending essentially in the axial direction. This expedient makes it possible to give the grooves, in conjunction with the deformation of the lands which follows, a profile which internally is enlarged in the manner of a wedge without having to resort to more elaborate production techniques. Also the wedgelike taper of the grooves in the direction of the point of connection of the particular bead, which in accordance with the invention is essential, does not pose any particular difficulties. Good sealing is achieved with an angle of the sides of about 10° to 25° each. Particularly advantageous is an angle of about 15°.

The operative and interlocking connection between the lip ring and the reinforcing ring corresponds to the idea underlying the present invention insofar as vulcanization of the lip ring is followed by a cooling which gives rise to considerable dimensional shrinkage. This shrinkage produces an elastic stress-induced distortion of the bead or beads in the grooves. Excellent mechanical interlocking of the two parts and an excellent seal at the line of contact are thus assured in every case.

The choice of the materials of construction for the reinforcing ring and the lip ring is not subject to any particular restrictions. The reinforcing ring may be further reinforced by embedded glass fibers or, optionally, other elements. All that need to be borne in mind is that the usual vulcanizing temperatures are on the order of about 160° to 180° C. It is desirable that the plastic material used to make the reinforcing ring be plastically moldable at appropriate temperatures without, however, changing its shape on its own.

The lip ring is advantageously formed by the use of extrusion techniques with observation of the known limiting conditions. However, depending on the design of the profile of the grooves, compression-molding methods may be employed. In any case, it is important that the temperatures used be sufficiently high for the bead or beads of the lip ring to be elastically distorted in the grooves of the reinforcing ring after the final cooling. The effect of good anchorage and simultaneous sealing in accordance with the invention can be achieved only if such stress-induced distortion is assured.

DETAILED DESCRIPTION OF THE DRAWINGS

Figure 1:
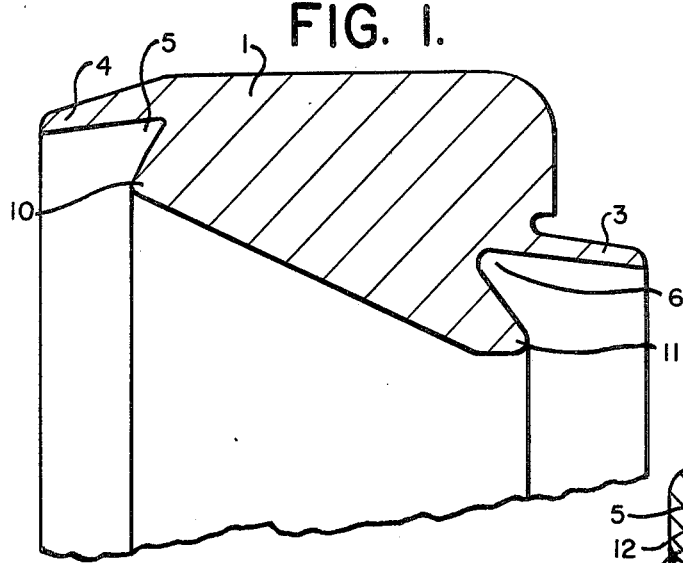
FIG. 1 is a partial sectional view of a reinforcing ring with two grooves according to the invention.

Referring now to FIG. 1, a reinforcing ring 1 with two grooves 5 and 6 is bounded by bands 4, 10 and 3, 11 extending essentially in the axial direction.

Figure 2:
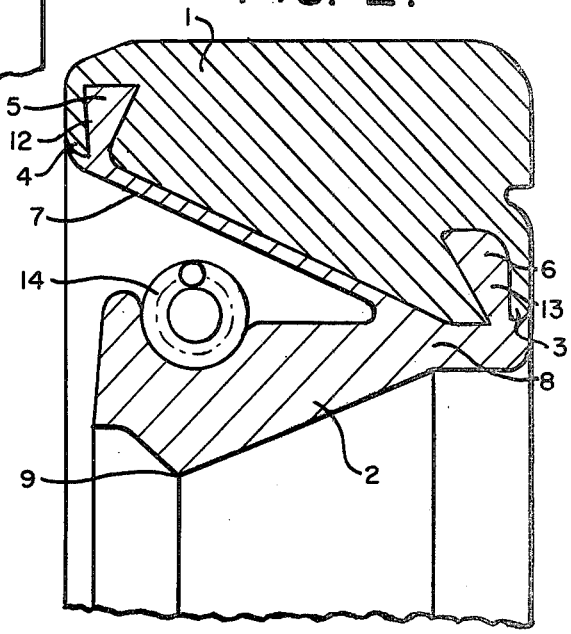
FIG. 2 is a partial sectional view of the ring of FIG. 1 with the lip ring mounted thereto.

FIG. 2 shows the same reinforcing ring after deformation of the lands 3, 4 and after the formation, and connection therewith, beads 12 and 13 of lip ring 2. The radially inwardly open grooves 5 and 6 after deformation are enlarged to a wedgelike profile.

The grooves 5 and 6 enclose in interlocking manner the two beads 12, 13 formed from the elastically resilient material of construction of the lip ring 2. Due to the manufacturing process, the beads are initially tensioned themselves and relative to each other. The relative mobility of the sealing lip 9 is not impaired thereby. It is joined to the part 7 connecting the two beads 12, 13 through a membranelike intermediate part 8. The sealing ring is then held in place on a shaft by tension member 14.

Figure 3:
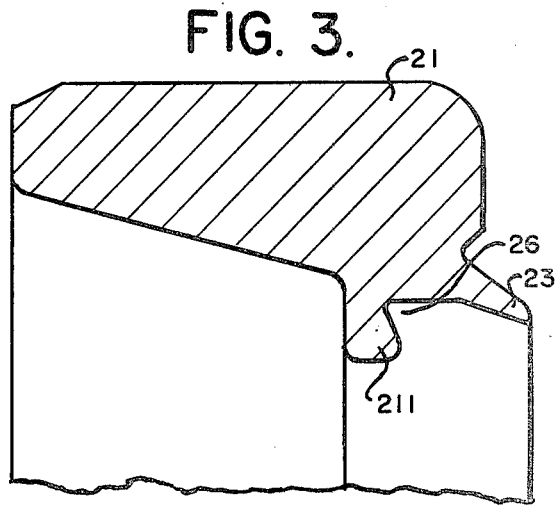
FIG. 3 is a partial sectional view of the reinforcing ring of the invention with one groove.

Shown in FIG. 3 is a reinforcing ring 21 having but one groove 26 which is bounded by two lands 23 and 211 extending essentially in the axial direction.

Figure 4:
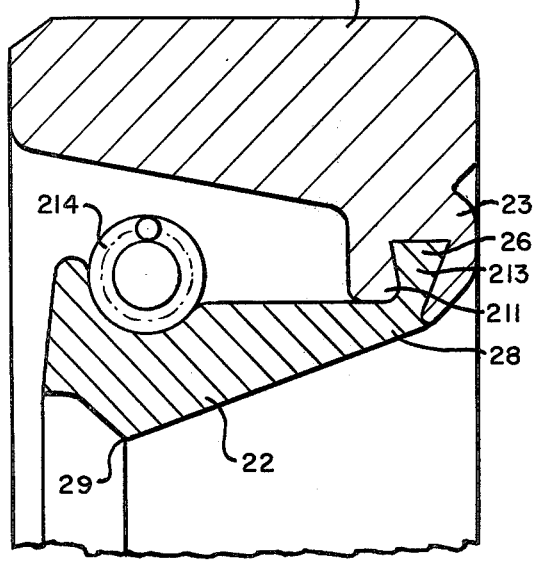
FIG. 4 is a partial sectional view of the ring of FIG. 3 with a lip ring mounted thereto.

FIG. 4 shows the same reinforcing ring 21 after it has been joined to the lip ring 22 with deformation of the land 23. Again the groove 26 is formed whose profile is enlarged in the manner of a wedge in the interior of the reinforcing ring and whose opening is directed radially inwardly. The lip ring 22 has a dynamic-seal lip 29 and is joined to the bead 213 disposed in the groove 26 through a membranelike intermediate part 28. Particularly the radial shrinkage of the bead 213 after the pressure relief due to installation or cooling results in excellent interlocking and sealing of the two components relative to each other.

The sealing ring in accordance with the present invention has a satisfactory overall stability and may therefore be employed in applications which heretofore have been reserved for shaft sealing rings having a metallic reinforcing ring. Manufacture poses no problems and there is no need, for example, to use adhesives at the juncture between reinforcing ring and lip ring. Excellent sealing action is nevertheless assured. The mechanical interlocking of the two components is excellent.

It will be understood that the specification and examples are illustrative but not limitative of the present invention and that other embodiments within the spirit and scope of the invention will suggest themselves to those skilled in the art.

What is claimed is:

1. A sealing ring comprising a reinforcing ring composed of thermoplastic material having at least one annular groove therein; and a lip ring concentrically nested in the reinforcing ring and having a circular bead for each annular groove having the same profile and set therein, wherein each bead has a profile which in the projecting portion is enlarged in the manner of a wedge extending essentially radially outwardly, the nominal diameter on which each bead is disposed being smaller than the nominal diameter of the associated groove.

2. The sealing ring according to claim 1, wherein the sides of the wedgelike enlarged profile of each bead are at an angle of about 20° to 50°.

3. The sealing ring according to claim 2, wherein the angle is about 30°.

4. The sealing ring according to claim 1, wherein the nominal diameter of at least one bead is at least about 0.5% smaller than the nominal diameter of the associated groove.

5. The sealing ring according to claim 4, wherein the nominal diameter of at least one bead is at least about 2% smaller than the nominal diameter of the associated groove.

6. The sealing ring according to claim 1 wherein the reinforcing ring comprises two annular grooves and the lip ring comprises two beads, and wherein the beads and grooves are disposed in proximity to the opposed axial ends of the contact surface on both sides.

7. A method for the manufacture of a sealing ring according to claim 1 comprising first producing the reinforcing ring with a groove whose profile is enlarged in the direction of the opening bounded by the lands, setting the bead of the prefabricated lip ring into the groove with radial expansion of the clamping part in proximity thereto; and deforming the lands in such a way that they uniformly enlcose the bead.

8. The method according to claim 7, wherein the lands are deformed by at least one of pressure, heat and beading with rolls.

9. The method according to claim 7 wherein the lands are deformed by the use of high-frequency oscillations.

10. A method for the manufacture of a sealing ring according to claim 1, wherein a lip ring is formed from an elastomeric material by extrusion in the hot plastic state onto a reinforcing ring made of a thermoplastic material, vulcanizing the lip ring and then cooling same and wherein the reinforcing ring is produced in a first injection mold and with a groove whose profile is enlarged in the direction of the opening bounded by the lands and the lands are deformed in such a way that the groove is given an internally wedgelike enlarged profile; and wherein the lip is extruded in a second injection mold and vulcanized by the use of heat in such a way that the bead and the lip ring are formed by the filling of the groove and of the remaining cavity of the injection mold.

11. The method according to claim 10, wherein the lands are deformed by the closing motion of the second mold, and the elastomeric material is injected immediately thereafter and vulcanized with simultaneous heating of the lands.

* * * * *